United States Patent [19]
Allocco, Jr.

[11] 3,945,059
[45] Mar. 23, 1976

[54] SWIMMING POOL WATER HEATING SYSTEM

[75] Inventor: Andrew Allocco, Jr., Miami Lakes, Fla.

[73] Assignee: Lawrence Peska Associates, Inc., New York, N.Y.; a part interest

[22] Filed: Aug. 9, 1974

[21] Appl. No.: 496,007

[52] U.S. Cl. ............... 4/172; 4/172.15; 4/172.21; 126/271
[51] Int. Cl.² ......................................... E04H 3/16
[58] Field of Search............ 4/172, 172.11, 172.12, 4/172.13, 172.14, 172.21, 172.15; 126/271

[56] References Cited
UNITED STATES PATENTS

| | | | |
|---|---|---|---|
| 2,907,318 | 10/1959 | Awot | 126/271 |
| 3,200,820 | 4/1965 | Garrett | 126/271 |
| 3,513,828 | 5/1970 | Masters | 126/271 |

*Primary Examiner*—Houston S. Bell, Jr.

[57] ABSTRACT

A solar water heating device and construction for heating the water in a swimming pool from the heat derived from the rays of the Sun. The pool is constructed with a border platform or coping around its edges with a hollow passageway under the metal top surface of the coping. The passageway has water pipes extending therethrough and connected to the pool circulating pumps for circulating pool water through the water pipes. Heating fins are carried by the water pipes and extend into heat exchange contact with the metal top coping, which is being heated by rays from the Sun. Thus the Sun's rays are conducted in the form of heat into the piping water for circulation into the pool and heating its water economically.

4 Claims, 3 Drawing Figures

U.S. Patent   March 23, 1976   3,945,059
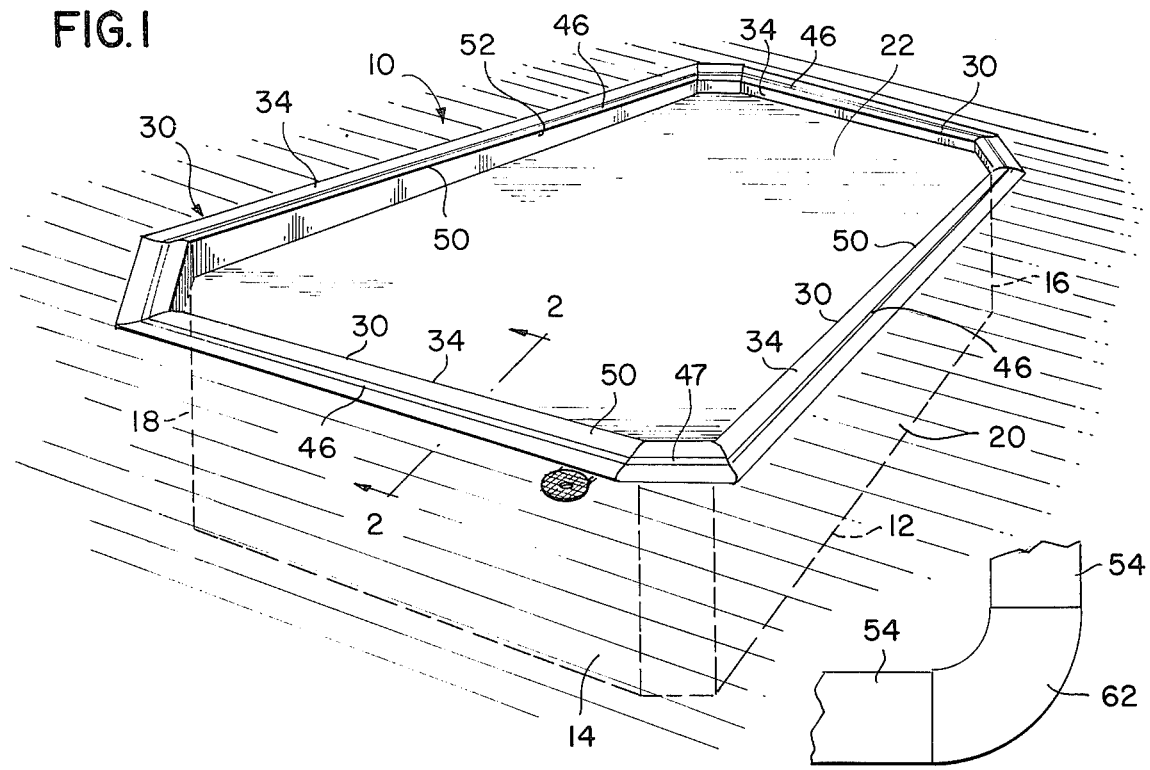
FIG. 1
FIG. 3
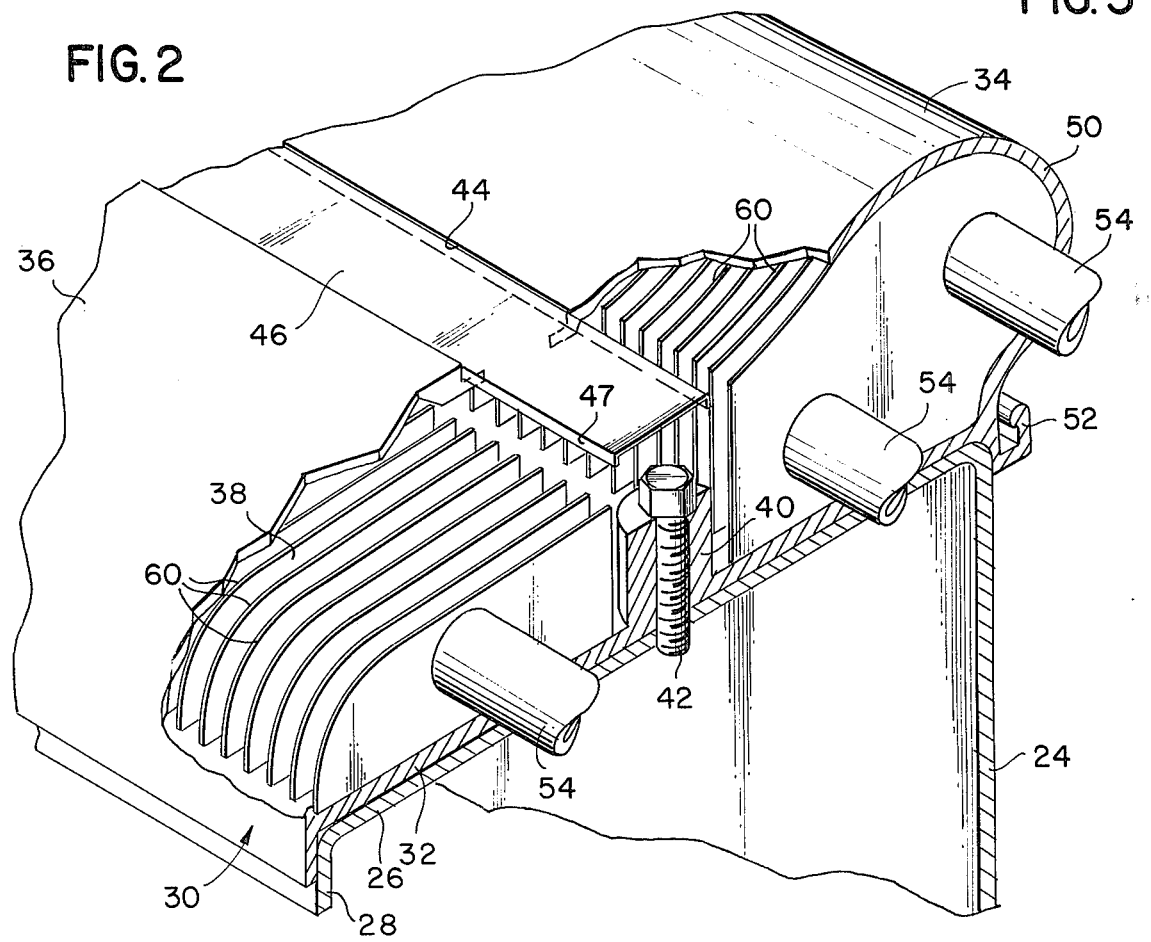
FIG. 2

SWIMMING POOL WATER HEATING SYSTEM

This invention relates to improvements in devices and systems for utilizing the heat of the rays from the Sun to heat water in a swimming pool or other container.

An object of the invention is to provide a novel and improved swimming pool water heater device which heats the pool water using the heat of the Sun.

Another object of the invention is to provide a novel and improved swimming pool water heater construction in which the metal border or coping of the edges of the pool is adapted to receive the heat rays of the Sun and to become quite hot, and in which means are disposed inside the hollow coping for absorbing the heat and conducting it into pipes containing pool water for circulation through the pool itself, so as to heat up the pool water.

A further object of the invention is to provide a novel and improved swimming pool heating device in which there are water circulating pipes located under the hollow coping border of the pool and having heat receiving fins closely fitting against the inside surfaces of the metal coping border of the pool for optimum transfer of the heat from the coping to the water circulation ducts, and including pumps for circulating the pool water through the ducts to keep warming it up under the influence of the Sun's rays.

Still another object of the invention is to provide a novel and improved pool heating construction in which the border coping of the pool is made in sections which are easily installed and removable for inspection of the underlying finned water circulating pipes, and for repairs and replacement as needed.

Still a further object of the invention is to provide a novel and improved Solar pool heating construction which is simple in design, made up of very few parts and which can be installed at low cost in most swimming pools.

The above and other objects and advantages of the invention will become apparent from the following description of a preferred embodiment thereof, as illustrated in the accompanying drawings, forming a part hereof.

In the drawings:

FIG. 1 is a perspective view of a swimming pool in which the heating device is installed.

FIG. 2 is a perspective view taken substantially on Plane 2—2 of FIG. 1, and partly further broken out to show the construction.

FIG. 3 is a detail plan view of an elbow connecting two lengths of duct pipes at a corner of the heating construction.

In connection with the use and installation of swimming pools, especially in areas where the temperature of the air is variable, it is more and more common to provide means for heating the water in the pool. In fact, it has been found to be desirable to heat the water even when the outside temperature is somewhat cold, for the simulating effect which a good swim in the heated pool has on the swimmers, and further when they step out into the cold ambient air before putting on their robes.

Of course many outdoor pools are now made with glass or plastic movable enclosures so that they can be used in cold weather, while the Sun continues to shine brilliantly through the glass or plastic roofing and walls, giving somewhat of a "greenhouse" effect. The present invention seeks to make use of the rays of the Sun to keep the pool water comfortably warm, and thus avoids the considerable expense of using oil or gas or electric heaters to warm up the water.

In order to understand clearly the nature of the invention, and the best means for carrying it out, reference may be had to the drawings, in which like numerals denote similar parts throughout the several views.

As shown, there is a swimming pool 10 with a bottom or floor wall 12, upstanding end walls 14 and 16 and left and right side walls 18 and 20, to receive the pool body of water 22. The pool may have lining inner walls 24 of sheet metal or sheet plastic which is now common for lining pools and is waterproof against leakage and easily cleaned as needed.

The lining walls have top flange portions 26 which lie upon the top edges of the side walls of the pool, and with downturned end flanges as at 28 to hold them firmly in place. The walls are surmounted with a covering border or coping platform 30 which is fairly wide and extends all around the tops of the four walls of the pool, and it has a floor wall 32 formed of sheet material such as aluminum or sheet iron, and a somewhat smoothly curved or rounded top covering shell 34.

The top covering shell 34 may be made of sheet metal such as aluminum, galvanized iron or the like which is rust resistant, and is usually coated with a baked-on enamel, paint or plastic coating 36. There is thus formed under the outer platform or coping shell a hollow area or chamber or passageway 38, the floor of which is the floor wall 32, and support posts 40 are secured to the floor wall 32 by welding, cement, bolting or the like attachment by aid of bolts 42.

As the cover shell 34 is preferably formed in one continuous piece, it may be formed with a longitudinal channel or recess 44 to receive a snap-in filler strip molding 46 formed of sheet material such as plastic coated aluminum with side flanges 47 to snap into the receiving channel 44. The ends of the filler strip molding 46 may be bent down to extend past the bolts 42 and have holes through which the bolts extend.

As seen best in FIG. 2, the covering shell 34 is preferably more upraised and rounded or arched at its inner edge portion 50 to provide a hand-hold for swimmers getting out of the pool or to just hang on while resting, and there is a gutter 52 formed below the arched edge portion 50, to skim off surface debris from time to time off the top of the water as the level is raised for this purpose, the gutter being inclined for good run-off into drains along its length to aid in keeping the pool water clean.

It has been found that the metal platform or border platform coping 34 picks up a great deal of heat from the Sun, even though it is coated, and is usually very hot to stand or sit on, and if colored darker, it will absorb even more heat from the Sun. With the present invention, that heat is picked up and utilized to warm up the water in the pool. For this purpose, water circulating pipes 54 are extended longitudinally through the hollow passageways or chambers 38 inside the hollow coping shell 34, and are connected so as to pick up water from the pool from the filter outlet and usual filter pumping pump, and circulating the water from the filter outlet into the coping loop formed by the pipes 54 for three or more passes around the hollow pool border coping, and then to re-enter the filter on the pump suction. Valves are used to shut off the inlet and outlet taps of this system to stop further pool water temperature gain if necessary.

The three copper tubes 54 have expanded aluminum or copper fins 60 extending out of their outer surface and made into good heat exchange contact with the tubes by soldering, welding, brazing or other means. The fins 60 are also shaped on their outer edges to fit closely against the inside of the cast or otherwise formed aluminum coping shell 34 so as to be in good heat exchange contact therewith for receiving efficiently heat therefrom and conducting it to the tubes 54.

The heat from the border coping 34 will be absorbed by the fins and transferred to the water circulating through the tubes 54, and the result will be an increase in the overall pool water temperature and a decrease in the surface temperature of the coping 34, which is much desirable. The fins will also efficiently absorb any heat which is inside the hollow channels under the coping and also transfer it to the water tubes.

The coping sections 34 will be made in various lengths to fit the pool, and precast ninety degree corner sections or elbows 62 shown in FIG. 3, will be available so that a package can be sold for any standard size pool kit, and the elbows and tubes are formed to fit together easily and to block leakage by use of adhesive sealants, gaskets, washers, soldering or use of mechanical couplings. A hollow dummy section of the housings and coping coverings may be used to allow access to the copper unions that connect the water tubes. An end section will also be made for the inlet and outlet piping to the system and the pumps.

The channel groove 44 is cast or formed in the top of the shell 34 to receive the filler strip 46 which is continuous throughout the length of the system or major areas, so that the hold-down bolts or screws 42 may be accessible at any time for removal of coping for repairs or to aid in installation of this system on existing pools.

Although the invention has been described in specific terms, it is understood that various changes may be made in size, shape, materials and arrangement without departing from the spirit and scope of the invention as claimed.

Having herein described the invention, what is claimed as new is:

1. A pool water heating device for heating the water in a pool from solar heat from the Sun, and wherein said pool is constructed with border panel coping means in the path of rays from the Sun, and having a hollow area formed under the coping means, said heating device comprising water conducting piping means extending into said hollow area, coupling means for conducting water from said pool into and through said piping means, heat receiving and transfer means disposed within said hollow area for conducting heat to said piping means for heating said water flowing therein, water circulating means for circulating said water from said pool through said piping means and back into said pool, said border panel coping means comprising border platform means forming a border around the edges of said pool and formed with a substantial surface area capable of direct exposure to the rays of the Sun for being heated thereby, said heat receiving and transfer means extending outwardly laterally of said piping means and in heat exchange contact with said piping means and said heat receiving and transfer means having the outer edges thereof extending outwardly to and in heat receiving heat exchange contact with said coping means for receiving heat therefrom for conducting said heat to said piping means for heating said water circulating therein and for removing heat from said coping means.

2. The construction of claim 1, and wherein said heat receiving and transfer means comprises a plurality of metallic fin members secured to and extending outwardly from said piping means and in heat exchange contact therewith, and having outer edges of said fin members extending to and in heat exchange contact with said coping means for receiving heat therefrom, and wherein said border panel coping means comprises metal sheet material for receiving said rays of the Sun and for being substantially heated thereby.

3. The construction of claim 2, and wherein said border panel coping means comprises a hollow downwardly open shell body forming said hollow area as a passageway for containing said piping means extending therethrough and said fin members, and hold-down means for holding down said shell body.

4. The construction of claim 3, and wherein said shell body has a channel formed therein, and hold-down means comprising a hold-down strip seated in said channel, and bolt means for holding said strip and shell body in position.

* * * * *